Feb. 15, 1938. F. W. COTTERMAN 2,108,105
AUTOMATIC AUTOMOTIVE TRANSMISSION MECHANISM
Filed June 5, 1933 4 Sheets-Sheet 2

INVENTOR
Frederick W. Cotterman

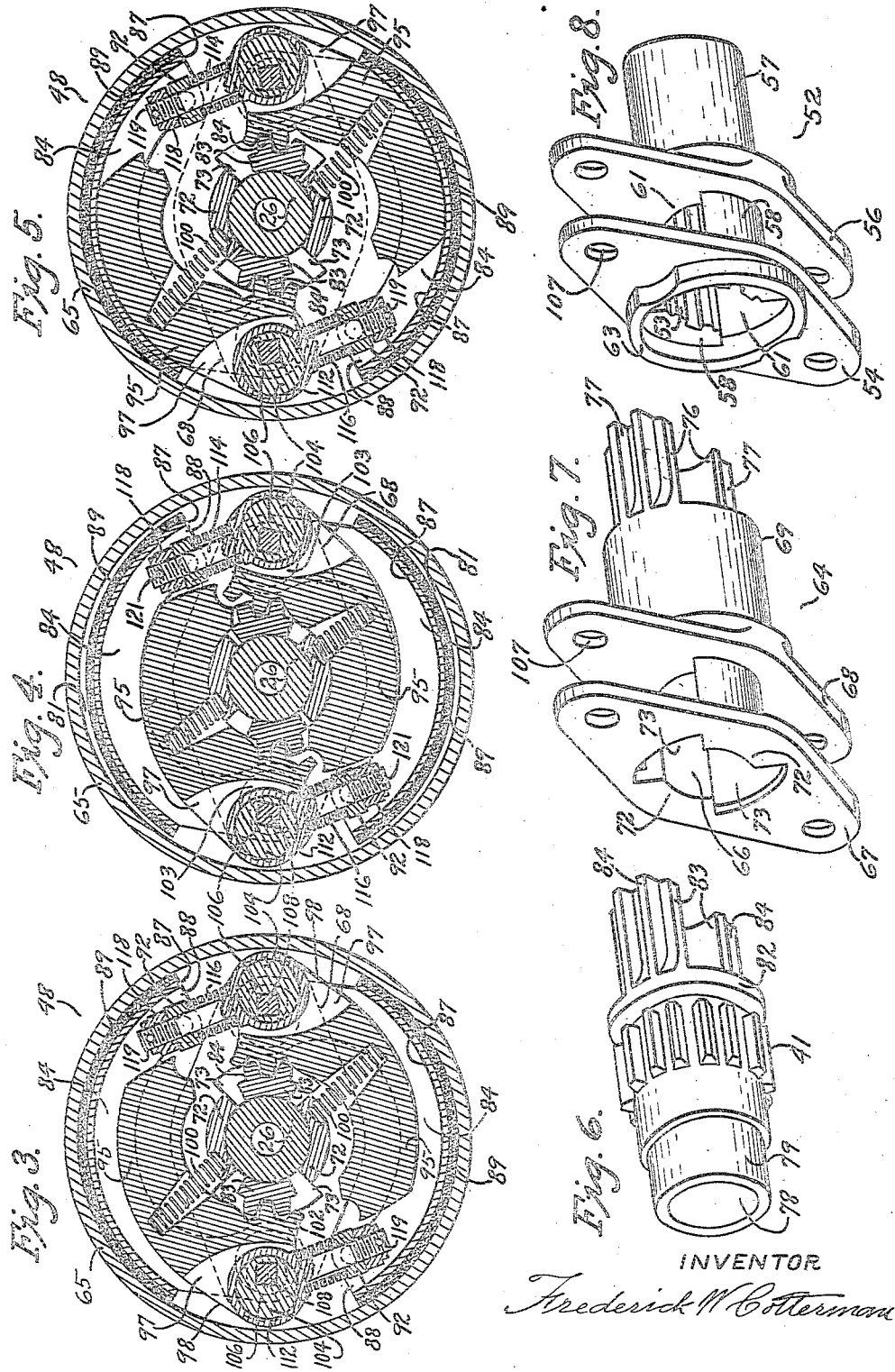

Feb. 15, 1938.　　F. W. COTTERMAN　　2,108,105
AUTOMATIC AUTOMOTIVE TRANSMISSION MECHANISM
Filed June 5, 1933　　4 Sheets-Sheet 4
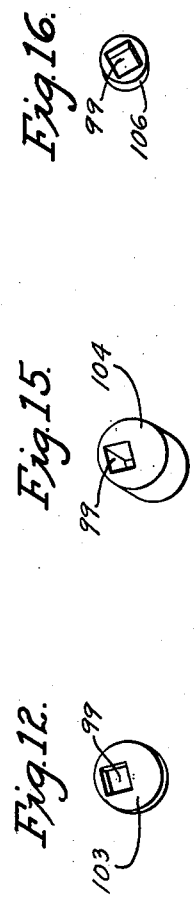
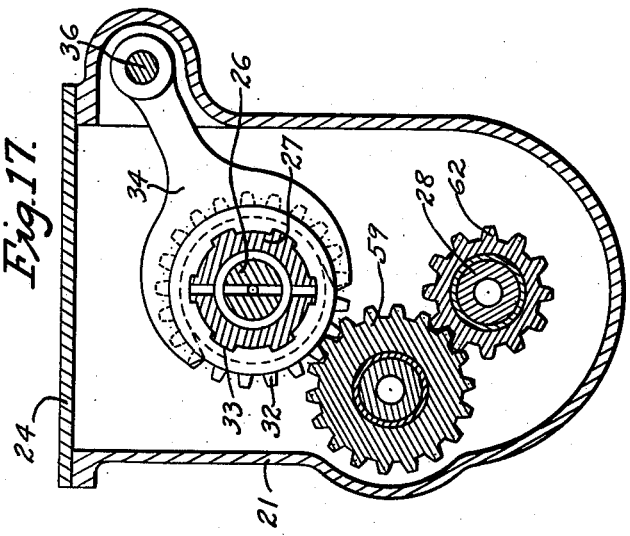
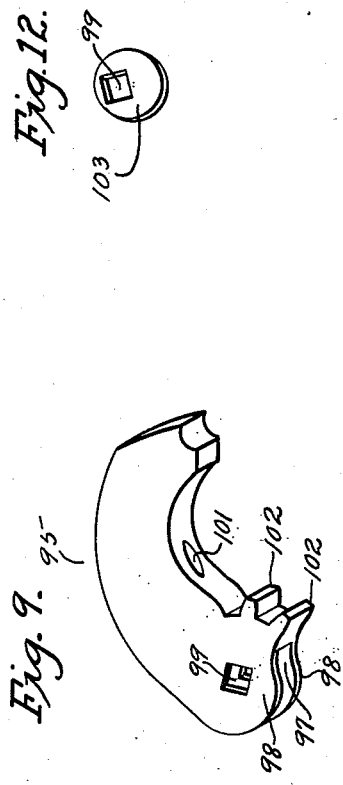
INVENTOR
*Frederick W. Cotterman*

UNITED STATES PATENT OFFICE 2,108,105

AUTOMATIC AUTOMOTIVE TRANSMISSION MECHANISM

Frederick W. Cotterman, Dayton, Ohio, assignor of one-half to Bessie D. Apple, Dayton, Ohio Application June 5, 1933, Serial No. 674,280

11 Claims. (Cl. 192—103)

This invention relates to power transmission mechanism and is particularly adapted for automatically changing the speed ratio between the wheels of an automotive vehicle and the engine which is driving them.

The object of the invention is to provide a simple, inexpensive and compact mechanism which will smoothly and automatically, without any attention from the operator, change to a higher gear whenever the power being developed exceeds the load, and to a lower gear whenever the load exceeds the power being developed, regardless of the miles per hour which the vehicle is moving when such load conditions occur.

That I attain this and many other objects and meritorious features will be apparent from a consideration of the following description taken in conjunction with the drawings, wherein, Figs. 1 and 2 are longitudinal-vertical and longitudinal-horizontal sections respectively through an illustrative embodiment of the invention.

Figs. 3, 4 and 5 are transverse sections taken at 3—3 of Fig. 2 showing a clutch operated to its three positions.

Figs. 6 to 16 are detail views of some of the parts.

Fig. 17 is a transverse section taken at 17—17 of Fig. 1.

Similar numerals refer to similar parts throughout the several views.

Figure 1:
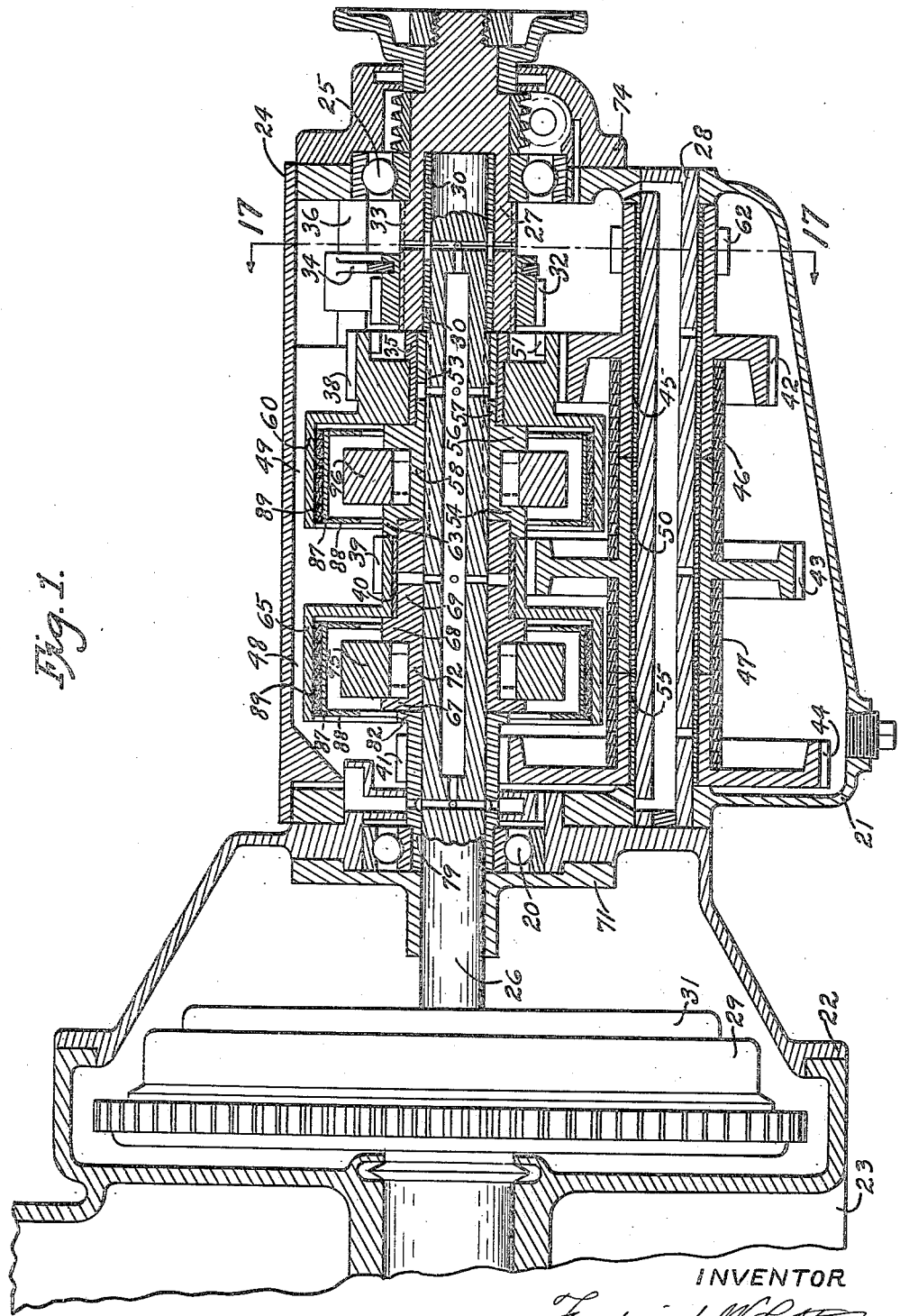

The transmission housing 21 is mounted on the flywheel cover 22 which is in turn secured to the engine 23. The cover 24 closes the upper open side of the housing.

Rotatably supported in bearings 20 and 25 in the housing 21 are the drive shaft 26 and the driven shaft 27. Bronze bearing bushings 30 are press fitted into the driven shaft 27 where the drive shaft 26 has rotative movement within it. A parallel spaced apart countershaft 28 is non-rotatably held in hubs in the end walls.

Within the flywheel 29, a clutch 31 is provided for rotatably connecting the drive shaft 26 to the engine, whereby it is revolved at engine speed. The clutch 31 is preferably centrifugally operated and adapted to connect and revolve the shaft 26 at engine speed whenever the engine exceeds a predetermined minimum R. P. M.

Figure 2:
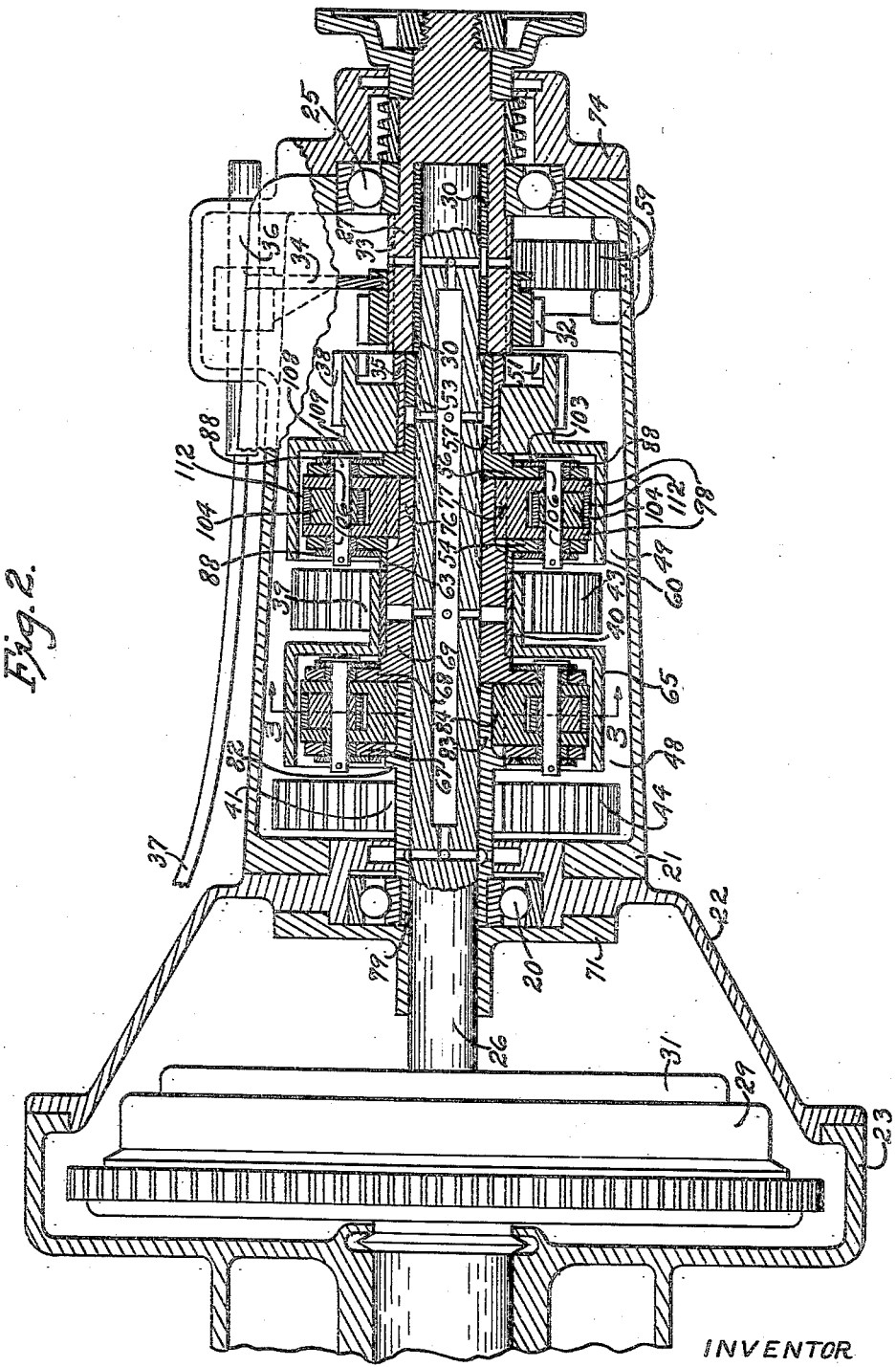

A gear 32 is splinedly mounted on the driven shaft 27. (See splines 33 in Fig. 7.) A shifter fork 34 on the rod 36 may move the gear axially in either direction from the position shown. The rod 36 is adapted to be connected to a push button on the instrument panel (not shown) by the control wire 37 (see Fig. 2). The gear 32 is moved forward on the splines 33 until its teeth enter the internal teeth 51 of the gear 38 for forward movement of the vehicle, and backward until its teeth engage the reverse idler gear 59 (see Figs. 2 and 17) which meshes with the reverse pinion 62 for backward movement of the vehicle. The reverse pinion 62 is integral with the countershaft gear 42.

A high speed gear 38, a second speed gear 39 and a low speed gear 41 surround the drive shaft 26. Gears 42, 43 and 44 on the countershaft 28 mesh with the gears 38, 39, and 41 respectively. Bronze bearing bushings 35, 40, 45, 50 and 55 line the gears 38, 39, 42, 43 and 44 respectively.

The gears 42, 43 and 44 are separately rotatable but are joined by the overrunning spring ratchets 46 and 47. Because of these ratchets the gear 43 may revolve faster but not slower than the gear 44, and the gear 42 may revolve faster but not slower than the gear 43.

The low speed gear 41 always revolves at the same speed as the drive shaft 26, but the second speed gear 39 does not revolve at the same speed as the drive shaft until it is directly connected thereto by the second speed clutch 48.

Similarly the high speed gear 38 does not revolve at the same speed as the drive shaft until it is directly connected thereto by the high speed clutch 49. The second speed gear 39 and the high speed gear 38 have integral clutch drums 65 and 60 respectively whereby they are connected to revolve with the drive shaft 26 by the clutches 48 and 49.

Whenever the gear 32 is pushed forward on the splines 33 until its teeth enter the internal teeth 51 of the gear 38 and neither of the clutches 48 or 49 are engaged, then the drive will be by the gear 41 through 44, 47, 43, 46, 42, 38, 51, 32, 33, to the driven shaft 27. In such a case low gear will be in effect.

When, however, the second speed clutch 48 becomes engaged, the drive will be by the second speed gear 39 through 43, 46, 42, 38, 51, 32, 33, to the driven shaft 27. In this case second gear is in effect.

When the high speed clutch 49 becomes engaged, the drive will be by the high speed gear 38 through 51, 32, 33 to the driven shaft 27.

When low gear is effective, both of the spring ratchets are driving. When second gear is in effect, the ratchet 46 is still driving, but the gear 43 is overrunning the gear 44 through the spring ratchet 47. And when high gear is effective, neither spring ratchet is driving, but the gear 43 overruns the gear 44 through the ratchet 47 and the gear 42 overruns the gear 43 through the ratchet 46.

When low gear is in effect the gears 41, 39 and 38 all revolve at different speeds and the gears 44, 43 and 42 all revolve at the same speed. But when high gear is effective the gears 41, 39 and 38 all revolve at the same speed while the gears 44, 43 and 42 all revolve at different speeds.

For the high speed clutch 49 there is a frame 52 (see detail Fig. 8) which has splines 53 engaging corresponding splines in the drive shaft 26. This frame comprises a front plate 54, a back plate 56, a hub 57 extending from the back plate, and two quarters 58 of another hub connecting the front and back plates together, the other two quarters of this second hub being cut completely away as at 61, 61. The splines 53 extend lengthwise entirely through the frame. A ring 63 extends from the front plate 54 to keep the gear 39 from moving axially out of its correct position.

For the second speed clutch 48 there is a frame 64 (see detail Fig. 7) which has a bore 66 slidably fitted to the shaft 26. This frame comprises a front plate 67, a back plate 68, a hub 69 extending from the back plate, and two-quarters 72 of another hub connecting the front and back plates together, the other two quarters of this second hub being entirely cut away as at 73, 73.

The back end of the hub 69 is all cut away except two opposite portions 76 each comprising one-sixth of the circumference of the hub. On each of those one-sixth portions, two gear teeth 77 are cut. These one-sixth portions 76 will hereinafter be called the high speed torque segments (see Figs. 2 and 7).

The low speed gear 41 (see detail Fig. 6) has a bore 78 slidably fitted to the drive shaft 26, a hub 79 to which the ball bearing 29 is press fitted, and a rearwardly extending hub 82 which is all cut away except two opposite portions 83 each comprising one-sixth of the circumference of the hub. On each of these one-sixth portions, two gear teeth 84 are cut. These one-sixth portions 83 will hereinafter be called the second speed torque segments (see Figs. 2 to 6).

When the high speed clutch frame 52, the second speed clutch frame 64, and the low speed gear 41 are assembled with the drive shaft 26, the splines 53 of the frame enter the shaft splines, the high speed torque segments 76 enter the cut away portions 61 of the high speed frame, and the second speed torque segments 83 enter the cut away portions 73, 73 for the second speed frame.

Inasmuch as the torque segments 76 and 83 each occupy but one-sixth of the circumference, and the cut away portions 61 and 73 each occupy one-fourth of the circumference it will be seen that the frame 64 is driven by the frame 52 with one-twelfth of a revolution lost motion, and that the gear 41 is driven by the frame 64 with one twelfth of a revolution lost motion. It is this lost motion which is taken up in one direction when the load overcomes the power, and in the other direction when the power overcomes the load. By lost motion take-up in one direction the automatic clutches are engaged and in the other they are disengaged.

Two clutch shoes 84 (see detail Fig. 10) are carried by each of the clutch frames 52 and 64. The clutch shoes 84 each preferably comprise a bent strip 87 and two curved side plates 88, the three parts being preferably welded together. A friction facing 89 is attached to the outer surface of each shoe. The side plates 88 have the large holes 90 at one end and the smaller holes 91 at the other.

The trunnion blocks 92 (see detail Fig. 11) carry a trunnion 93 at each end. Trunnions 93 are fitted for free rotative movement in holes 91 of the side plates 88. Holes 94 extend transversely through the blocks. The blocks 92 are assembled with the side plates 88 before they are welded to the bent strips 87.

A pair of centrifugal weights 95 (see detail Fig. 9) are carried by the second speed clutch frame 64 and a second pair 96 exactly like 95 except that they are 10% lighter are carried by the high speed clutch frame 52. Weights 95 and 96 are slotted at 97, thereby leaving two hinge ears 98 each having a square hole 99 therethrough. Tapered holes 101 extend upwardly into the edge of the weights. Light coil springs 100 fit loosely in the tapered holes 101. These springs are such as to exert an outward pressure on the weights of not more than several pounds each. Integral gear teeth 102 are cut on each weight for registry with the teeth 77 and 84 of the high and second speed torque segments.

Eccentrics 103 (see detail Fig. 12) are equal in thickness to the side plates 88 and have free rotative movement in holes 90. Eccentrics 104 (see detail Fig. 15) are of proper thickness to fit into the space 97 between the hinge ears 98 of the weights 95 and 96. Collars 106 (see detail Fig. 16) have free rotative movement in each of the eight hinge holes 107 of the clutch frames 52 and 64. The eccentrics 103 and 104 and the collars 106 all have square holes 99 corresponding to the square holes 99 in the weights 95 and 96.

Square hinge pins 108 (see detail Fig. 13) fit slidably but snugly in the square holes 99. A head 109 prevents axial movement of the hinge pin in one direction and a transverse pin is placed in the small hole 111 to prevent axial movement in the other direction.

The connecting rods 112 (see detail Fig. 14) have openings 113 which have free rotative movement on the eccentrics 104 while the stems 114 pass freely through the holes 94 of the trunnion blocks 92. A heavy coil compression spring 116 is interposed between the shoulders 117 of the connecting rod and the flat surface of the trunnion block 92. A nut 118 extends over the threaded end 119 of the connecting rod and, when once adjusted, is held by the pin 121.

To facilitate assembly of the several parts hereinbefore described the following procedure is preferably followed.

Gears 42, 43 and 44 are assembled with the spring ratchets 46 and 47 and lowered into the housing 21 and the countershaft 28 entered and fastened. The idler gear 59 is then assembled in the housing and similarly secured.

Eight collars 106 are placed in the eight holes 107 of the two clutch frames 52 and 64. Eight eccentrics 103 are placed in the eight holes 90 of the shoes 84. Four connecting rods 112 are placed over the four eccentrics 104 and the assembled rods and eccentrics are then placed, one assembly in each slot 97 of the weights 96.

A pair of the shoes and a pair of the weights are then assembled with each of the clutch frames 52 and 64 by first entering the stems 114 of the connecting rods 112 into the holes 94 of the swivel blocks 92 with the heavy coil springs 116 between, and putting the nuts 118 and the pins 119 in place, then putting the light springs 100 in place, then putting a square hinge pin 108 through each of the square holes 99. When these hinge pins are entered care must be taken that the high sides of the eccentrics 103 are toward the axis of the clutch frame and the high sides of the eccentrics 104 are away from the axis of the clutch frames.

The gear 38 is then placed over the hub 57 of the clutch frame 52 with the drum 60 surrounding the one pair of clutch shoes. The gear 39 is next placed over the hub 69 of the clutch frame 64 with the drum 65 surrounding the other pair of clutch shoes. The assembled clutches 48 and 49 are then axially aligned and the torque segments 76 extending from the one assembly entered in the openings 61 of the other assembly and with the teeth 77 of the torque segments meshing with the teeth 102 of the clutch weights.

The assembly comprising the two clutches is now lowered into the housing 21 and the low speed shaft 27 carrying the gear 32 is entered through the bearing opening in one end of the housing while the low speed gear 41 is entered through the bearing opening in the other end of the housing. The torque segments 83 of the low speed gear enter the openings 73 within the clutch 48, the teeth 84 of the torque segments meshing with the teeth 102 of the weights 96. The flywheel cover 22 is then assembled with the housing 21 and the bearings 20 and 25 and their covers 71 and 74 are put in place. Lastly the shaft 26 is endwise entered into the structure. It will be seen that the light springs 100 will keep the clutches 48 and 49 mildly engaged as in Fig. 3, but inasmuch as the springs 100 exert only several pounds pressure each, the clutch engagement is not sufficient to transmit load of any appreciable amount. The operation of the mechanism is as follows:—

When the engine revolves slightly in excess of its idling speed the flywheel clutch 31 engages and drives the shaft 26 at engine speed. The shaft 26, through the splines 53 drives the high speed clutch frame 52. The high speed clutch 49 is mildly engaged by the light springs 100 but not sufficiently to transmit the load of starting the vehicle from rest. The high speed clutch 49 consequently slips one-twelfth of a revolution. This slippage takes up the lost motion between the openings 61 of the high speed clutch frame 52 and the torque segments 76 of the second speed clutch frame 64 whereupon the high speed clutch frame 52 drives the second speed clutch frame 64.

To take up this lost motion it was only necessary for the torque segments 76 to exert sufficient force on the teeth 102 of the weights 96 to pull the weight inward as in Fig. 4. But this pull completely disengaged the high speed clutch 49 by creating a space as at 81, Fig. 4, between the shoes 84 and the drum 60.

It may be seen that the space 81 is not such a space as would be created by the swinging of the shoe 84 from a single hinge point, but that the space 81 is fairly uniform throughout its length. This desirable result is had because both ends of each shoe are drawn away from the surface of the drum when the weights 95 and 96 move inward, the one end directly by an eccentric 103 and the other end by an eccentric 104 through the connecting rod 112.

Now the second speed clutch 48 is also mildly engaged by the light springs 100, but not sufficiently to carry a load of any consequence, therefore the second speed clutch slips one-twelfth of a revolution whereby the lost motion between the torque segments 83 and the openings 73 is taken up and the second speed clutch is completely disengaged as in Fig. 4 by the action of the torque segments 83 on the teeth 102 of the weights 95. With this lost motion taken up the second speed clutch frame 64 drives the low speed gear 41.

It will be seen that as soon as the flywheel clutch 31 engages and drives the shaft 26, the load of starting the vehicle at once disengages both clutches 48 and 49 and takes up the two lost motion connections, the one between the high speed clutch frame and the second speed clutch frame, and the other between the second speed clutch frame and the low speed gear.

In this condition the power is transmitted from the drive shaft 26 through parts 52, 64, 41, 44, 47, 43, 46, 42, 38, 51, 32 to the driven shaft 27. This is the low gear connection. With this connection in effect, the entire torque of the engine is being exerted to hold the weights 95 and 96 drawn in as in Fig. 4, against their tendency to fly outward due to centrifugal force.

With low gear in effect and the engine exerting 125 ft. lbs. torque the weights 95 will not overcome the restraining effect of the torque segments 83 to hold them in, until 18 M. P. H. is reached. On the other hand, if the fuel being fed to the engine produces only 25 ft. lbs. torque the weights 95 will overcome the restraining effect of the torque segments 83 when 8 M. P. H. is reached.

When a certain speed is reached, between 8 and 18 M. P. H. depending on what engine torque between 25 and 125 ft. lbs. is being exerted, the weights 95 move to the position shown in Fig. 3 thereby engaging the clutch 48 which connects the second speed gear 39 to revolve in unison with the drive shaft 26.

With the second speed gear so connected, the power is transmitted from the drive shaft 26 through parts 52, 64, 84, 65, 39, 43, 46, 42, 38, 51, 32 to the driven shaft 27. This is the second speed connection. When the second speed connection is thus made effective all load is removed from the spring ratchet 47, the gear 44, the gear 41, and its torque segments 83. Consequently when second gear connection is thus made there is no force exerted on the teeth 102 of the weights 95 to draw them in. Therefore the entire outward force of the weights is now available to keep the second speed clutch 48 engaged.

Now if, while in second gear, a certain vehicle speed is reached which may be somewhere between 15 and 34 M. P. H., depending on what torque between 25 and 125 ft. lbs. the engine is developing, the high speed clutch weights 96 will overcome the tendency which the torque segments 76 have to hold them in, and the high speed clutch 49 will engage. When the high speed clutch 49 engages, the drive will be from the drive shaft 26, through parts 52, 84, 60, 38, 51, 32 to the driven shaft 27. This is the high gear connection.

When the high gear connection is thus made effective all load is removed from the gear 42, the spring ratchet 46, the gear 43, the spring ratchet 47, the gear 44, the gear 41, the clutch 48 and the gear 39. There is now no force exerted by the load on the teeth 102 of either pair of weights 95 or 96 to draw them inward, therefore their entire force is exerted to keep the two clutches 48 and 49 engaged.

Now when high gear is in effect, if a load is imposed which is too great for the engine torque being at that time developed, the clutch 49 will let go, whereupon the second gear connection is re-made which instantly applies the force of the torque segments 76 to completely disengage the clutch 49.

Similarly any second speed load which exceeds the engine torque being at the time developed will re-make the low gear connection which will instantly completely disengage the clutch 48.

In the embodiment herein shown the several parts are so proportioned that when the engine is developing its maximum power the change from low to second speed takes place at 18 M. P. H. If the load then exceeds the power until the speed is reduced to 15 M. P. H. it returns to low. But if, while in second, it is underloaded until it can attain 34 M. P. H., it shifts to high; and if, when in high, the load exceeds the power until the speed is reduced to 28 M. P. H. the shift back to second gear takes place.

On the other hand if the engine is developing less than its maximum power the several shifts take place at different speeds. For instance, at one-fifth maximum power, the shift from low to second takes place at 8 M. P. H. But if the load in second then exceeds the power it shifts back to low at 6 M. P. H. If when in second speed it is underloaded until it can attain 15 M. P. H. it will shift to high and if overloaded in high it will drop to 13 M. P. H. and shift back to second.

From the foregoing it will be seen that the M. P. H. at which the several gear ratios change, depends on the torque which the engine is developing. If the vehicle operator depresses the accelerator pedal but slightly he may cause the vehicle to start in low gear, rise to 5 or 6 M. P. H. and change to second, then rise to 11 or 12 M. P. H. and change to high. If he then desires to drop back to second until more speed is attained he needs only to depress the accelerator pedal further. If the operator is feeding only a small amount of fuel and he encounters load conditions which gradually decelerate the vehicle he may either feed more fuel and keep the gear ratio in which he then is, or he may keep the fuel the same and automatically drop to a lower gear ratio.

On the other hand if the vehicle is at rest and the operator at once fully depresses the accelerator pedal, thus feeding maximum fuel, the vehicle will rise to 18 M. P. H. in low, go into second, rise to 34 M. P. H. in second and go into high.

The clutch 48 is shown in Fig. 4 as it appears during gear drive and in Fig. 3 as it appears when the weights 95 have moved out from the axis and pressed the friction linings 89 against the drum 65 to provide direct drive. The throw of the eccentrics is preferably such that when the center of gravity of a weight 95 moves outward 12/100 of an inch the friction facings 89 will move outward 1/100 of an inch. Thus as long as the weights 95 revolve fast enough to develop a centrifugal force of 50 lbs. each the facings 89 will be pressed against the drum 65 with a force of $12 \times 50 = 600$ lbs. each or 1200 lbs. for the two facings. The weights 95 are of such size that this force of 1200 lbs. is provided at 1400 R. P. M. of the engine.

Now centrifugal force increases with the square of the R. P. M., so the same weights which create a pressure of 1200 lbs. on the drum at 1400 engine R. P. M. will, at top engine speed of 4200 R. P. M., apply a pressure of $$\frac{4200^2}{1400^2} \times 1200 = 10{,}800 \text{ lbs.}$$

Now since a pressure of 1200 lbs. by the facings 89 against the drum 65 will transmit the full engine torque, it is desirable that no greater pressure than 1200 lbs. be ever applied. The heavy springs 116 are therefore interposed in the linkage, these springs being such that they will yield and be pressed down when the engine revolves faster than 1400 R. P. M. In this way, instead of applying 10,800 lbs. pressure of the facings against the drum at top engine speed there will be applied only 1200 lbs. thru the yielding linkage which contains the springs 116.

After 1400 R. P. M. the weights move out to the position shown in Fig. 5, the weights lying directly against the shoes. In this state one pound centrifugal force developed by a weight exerts one pound against a shoe and not 10 pounds as it does in Fig. 3 thru the linkage.

In my copending application Serial No. 650,523, filed January 6th, 1933, I show a structure wherein the clutches employed are somewhat similar to the clutches herein disclosed.

An important improvement in the clutches herein shown not contained in my copending application comprises the double eccentric movement which withdraws both ends of a clutch shoe away from the drum equally.

Great difficulty has been experienced with clutches operated by a plurality of centrifugal weights, for the reason that one or more of the weights sometimes move outwardly ahead of the others, thus creating a momentary unbalance which results in terrific vibration.

It will be observed that, in the arrangement herein shown, the weights must both move outward simultaneously because of the manner in which they are geared together.

An important feature of the clutches herein shown is that they become engaged by speed and disengaged by torque, and while they are herein applied to an automotive transmission, it will be apparent that many other uses may be found for a clutch which is operable to connect one member by a friction connection and to another member through a lost motion connection, and where load sufficient to cause said lost motion to take place disengages the friction connection, and where speed sufficient to overcome said load engages said friction connection.

Another important difference is in the arrangement of the structure whereby two gears of the former structure are eliminated.

Having thus described an embodiment of my invention, I claim:

1. A centrifugal clutch comprising, a frame, a drum rotatable independently of said frame, arcuate shoes carried by said frame adapted for frictional engagement with said drum, centrifugal weights having arcuate movement about hinges at the ends of the shoes, eccentrics turnable by the swinging movement of said weights, and means connecting said eccentrics with both ends of each shoe whereby a great movement of said weights moves both ends of said shoes a small but substantially equal distance to or from said drum, a portion of said connecting means being yieldable thereby permitting farther arcuate movement of said weights after said shoes engage said drum.

2. A centrifugal clutch comprising, a frame, a drum rotatable independently of said frame, arcuate friction members carried by said frame each having both ends movable toward or away from said drum, centrifugally operable weights hinged on said frame near the ends of said friction members, eccentrics extending oppositely from said hinges and turnable by said weights, and means connecting oppositely extending eccentrics to adjacent ends of said friction members, the connecting means at one end of each shoe being yieldable thereby permitting said eccentrics to be turned farther after said shoes come into contact with said drum.

3. In a torque controlled centrifugal clutch, a frame comprising two spaced apart plates, a hollow hub connecting said plates, arcuate parts of said hub being cut away, centrifugal weights supported to move outwardly between said plates, a power transmitting member adjacent one of said plates in axial alignment with said hub, and torque means on said member extending into said cut away places and engaging said weights to draw them inwardly.

4. The structure defined in claim 3 wherein the torque means comprises gear teeth on said member and corresponding pinion teeth on said weights.

5. In combination, a driving member, a driven member, centrifugal clutching means for rotatably connecting said members, said centrifugal clutching means comprising a carrier rotatable by said driving member, a weight supported on and revolvable by said carrier, a friction member supported on and revolvable by said carrier normally out of engagement with the driven member, and multiplying linkage connecting said weight to said friction member whereby a small force exerted by said weight exerts a great force to press said friction member against said driven member, said linkage comprising means operative when a predetermined rotative speed is exceeded to permit the increased force of said weight to be applied directly to said friction member independently of any multiplying effect.

6. Power transmitting mechanism comprising, a clutch drum, a clutch frame, hinge pins carried in circumferentially spaced apart positions on said frame, a pair of eccentrics having their high sides oppositely disposed mounted on each hinge pin, arcuate shoes each having one end attached directly to one of a pair of eccentrics and the other end thru a linkage to the other of a spaced apart pair of eccentrics, and centrifugal means for rotating said eccentrics simultaneously, said linkage comprising a yielding means between one end of each shoe and the eccentric which operates said one end.

7. A centrifugal clutch comprising, a rotatable frame, a coaxial drum rotatable independently of said frame, arcuate friction members carried by said frame and movable thereon toward and away from said drum, centrifugally operable weights hinged on said frame near the end of said friction members, eccentrics on said hinges turnable by swinging of said weights about said hinges, means connecting said eccentrics to said friction members, the connecting means being yieldable thereby permitting said eccentrics to be turned farther after said friction members come into contact with said drum, turning of said eccentrics being arrested, after said connecting means has yielded a predetermined amount, by contact of said weights with said friction members.

8. A centrifugal clutch comprising, a rotatable frame, a coaxial drum rotatable independently of said frame, arcuate shoes carried by said frame adapted for frictional engagement with said drum, centrifugal weights having arcuate movement about hinges at the ends of the shoes, eccentrics secured to said weights to be turned by said arcuate movement, connecting means between said eccentrics and said shoes whereby a great arcuate movement of said weights away from or toward the axis of rotation moves said shoes a small distance toward or away from said drum, a portion of said connecting means being yieldable thereby permitting further arcuate movement of said weights after said shoes engage said drum, said weights being adapted to come in contact with said shoes after said connecting means has yielded a predetermined amount.

9. An automatic clutch comprising, a rotatable frame, a coaxial drum rotatable independently of said frame, arcuate shoes carried by said frame adapted for frictional engagement with said drum, centrifugal weights swingable about hinges near the ends of the said shoes, means operable by swinging movement of said weights for moving said shoes toward or away from said drum, a yielding means interposed between the last said means and said shoes permitting said weights to move farther after said shoes engage said drum, movement of said weights being arrested by said shoes after the yielding means has yielded a predetermined amount, whereby the force of said weights is applied directly to said shoes.

10. A power transmitting clutch comprising, a rotatable frame, a coaxial clutch drum rotatable independently of said frame, arcuate shoes carried by said frame for frictionally engaging said drum, an eccentric carried by said frame rotatable to move said shoes into engagement with said drum, operating means having arcuate movement about the axis of said eccentrics to rotate said eccentrics, a yielding means interposed between said eccentrics and said shoes permitting further arcuate movement of said operating means after said shoes have engaged said drum, said operating means having space only for limited arcuate movement, whereby said yielding means may not press said shoes against said drum beyond a predetermined amount.

11. A power transmitting clutch comprising, a rotatable frame, a coaxial drum rotatable independently of said frame, arcuate shoes carried by said frame adapted for frictional contact with said drum, eccentrics carried by said frame rotatable to move said shoes into contact with said drum, means for rotating said eccentrics, yielding means between said eccentrics and said shoes permitting further rotation of said eccentrics after said shoes have made contact with said drum, said means for rotating said eccentrics being so limited in movement that movement of said eccentrics is arrested at a point where said yielding means is applying a limited pressure to said shoes.

FREDERICK W. COTTERMAN.